May 10, 1966    C. M. WETZEL    3,250,314
SEAL FOR FOLDING PARTITION
Filed Feb. 17, 1964
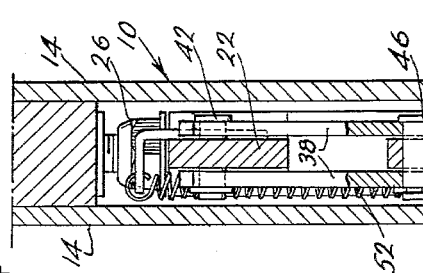
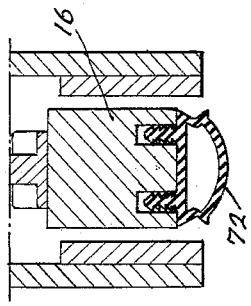
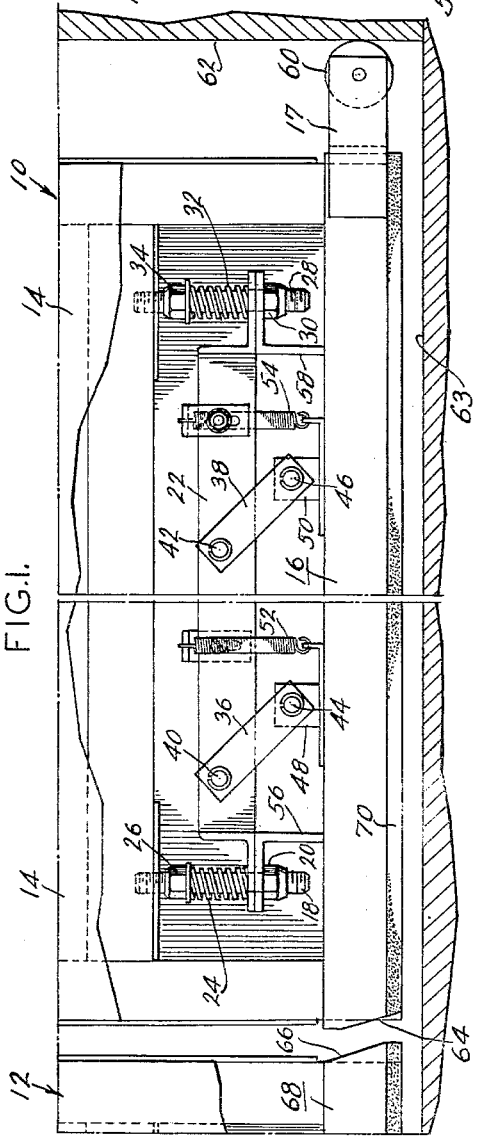
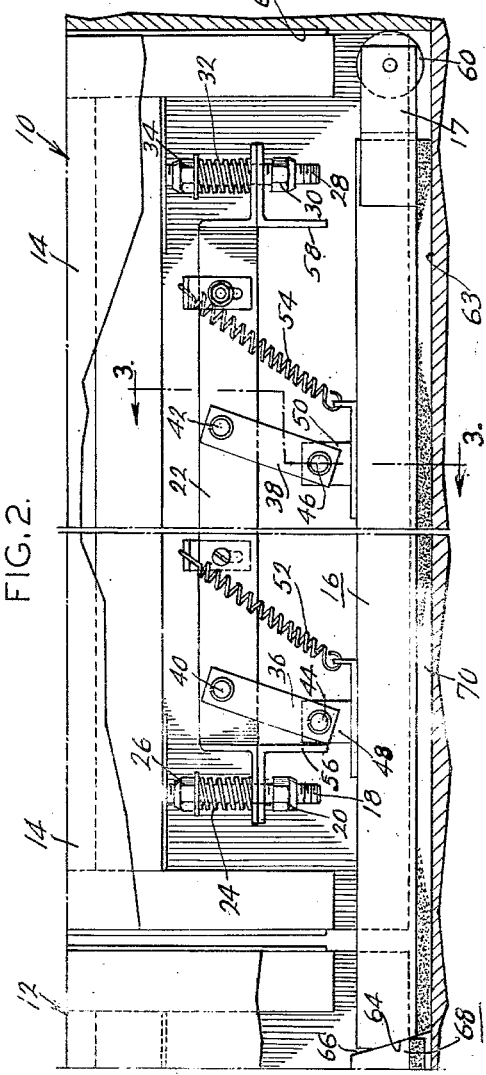
INVENTOR:
CHARLES M. WETZEL
BY Howson & Howson
ATTYS.

United States Patent Office 3,250,314
Patented May 10, 1966

3,250,314
SEAL FOR FOLDING PARTITION
Charles M. Wetzel, Villanova, Pa., assignor to Wayne Iron Works, Wayne, Pa., a corporation of Pennsylvania
Filed Feb. 17, 1964, Ser. No. 345,366
6 Claims. (Cl. 160—40)

The present invention relates to a floor seal assembly for partition doors and more specifically to such a floor seal assembly which is automatic in operation when the partition door is used for space partitioning.

Folding partition doors and unit panel walls are widely used to make maximum use of existing areas, produce privacy and reduce noise. In order to accomplish these objectives it is desirable to provide the partition doors with floor seal assemblies to meet the requirements of good sound insulation for preventing sound created in one room from being heard in the other room. Whether this requirement is met depends on the effectiveness of the partition in dividing and sealing off the two areas. Hence, it is the object of the present invention to provide a partition door with a floor seal assembly having a structure capable of tightly sealing a partition door in contact with the floor.

A further object of the invention is to provide a partition door with a floor seal assembly which operates automatically upon the door being placed in the space to be partitioned and retracts automatically upon the partition door being moved from the space to be partitioned. Another object of the invention is to provide a floor seal assembly of simple construction and one capable of being inexpensively manufactured and assembled.

According to the present invention these objectives are accomplished by having a sealing member pivotally mounted on the partition door with two types springs mounted between the sealing member and partition door. One type, extension springs, provides a means for holding the sealing member up from the floor when the partition door is not in operative position, and another, compression springs, urge the sealing member tightly against the floor when the partition door is in the desired operative location. By virtue of these features, the present invention provides a much simpler structure and, therefore, a less expensive structure, which is capable of extensive use without malfunction.

For a better understanding of the present invention, reference is made to the following drawings in which:

FIG. 1 is an elevational view of a leading and a second partition door in a series of partition doors with parts of the side panels of the doors broken away;

FIG. 2 is an elevational view similar to FIG. 1 in which the sealing member of the leading partition door is shown in contact with a floor and the sealing member of the second partition door is shown in contact with the sealing member of the leading door and in a position of downward movement toward the floor;

FIG. 3 is a sectional view taken along the line 3—3 of FIG. 2; and

FIG. 4 is a sectional view similar to FIG. 3 showing another embodiment of the lower portion of the sealing member which contacts the floor.

Referring to FIG. 1, a leading partition door 10 and a portion of a second partition door 12 are shown. The functioning of the second partition door is representative of the remainder of doors in a series of partition doors. A separate floor seal assembly is provided for each partition door. The floor seal assembly of the present invention can be seen in the leading partition door 10 which has a portion of its side panel 14 broken away. The floor seal assembly of the second partition door and the remainder of doors in a series of partition doors is similar in all respects to the floor seal assembly in the leading partition door with the exception of the wall-contacting or front end of sealing member 16 which has attached thereto a more elaborate bumper assembly 17, to be explained later.

The floor seal assembly is connected to the partition door 10 by parallel elongated guide members 18 and 28, shown as threaded screws, and stops 20 and 30, shown as lock nuts on the screws 18 and 28. The stops 20 and 30 serve as projecting members on the guide members 18 and 28 to limit the downward movement of a carrier means 22. The carrier means 22 extends between stops 20 and 30 and provides a movable coupling between the partition door 10 and the sealing member 16. As can be seen in FIG. 1, carrier means 22 is free to move in the direction of extension of the guide members, ordinarily the vertical direction, except as limited by stops 20 and 30 and by helical compression springs 24 and 32. The compression springs 24 and 32 are positioned around the guide members 18 and 28, respectively, between the carrier means 22 and stops 26 and 34, each retaining member being shown as a washer and lock nut on the guide members 18 and 28.

At least two parallel linkages 36 and 38 are provided to connect the sealing member 16 to the carrier means 22. The parallel linkages 36 and 38 are connected to the carrier means at pivot points 40 and 42, respectively, and are pivotally connected to the sealing member at the pivot points 44 and 46 on connector brackets 48 and 50, respectively, which are attached to the sealing member. The parallel linkages maintain parallelism between the carrier means and sealing member and also allow longitudinal and vertical movement therebetween.

The extension springs 52 and 54, shown as helical springs, urge the sealing member upward from the floor toward the carrier means. The stops 56 and 58 provided by extensions of carrier means limit the upward movement of the sealing member toward the carrier means when the sealing member is not against the floor surface. The stop 56 also serves the function of limiting the clockwise rotational movement of the parallel linkages 36 and 38 about pivot points 40 and 42, as shown in FIG. 2.

The leading end of the sealing member 16 is provided with a bumper assembly 17. The bumper assembly has a roller 60 which is mounted to roll downwardly along the wall 62 against which the door closes. The bumper assembly upon contact with the wall actuates the sealing member downward into contact with the floor surface 63.

The trailing end 64 of the sealing member 16 provides an abutment for the sealing member of the partition door which immediately follows in the series of partition doors. The leading end 66 or the end facing partition door 10, of the sealing member 68 on partition door 12, as shown in FIG. 1, provides the bumper assembly to actuate sealing member 68. The leading end of the sealing members on the remainder of partition doors provides the bumper assembly therefor, and the trailing end provides an abutment for the sealing member of the partition door which immediately follows in the series of doors.

In operation, when it is desired to partition off one area from another with the series of partition doors, the leading partition door 10 is moved along an overhead guide or track from which the tops of the doors are suspended between the areas to be separated. As the partition door 10 is moved toward abutment or wall 62, the forward movement of the bumper assembly and, hence, the forward movement of the sealing member is stopped on engagement with the wall 62. After the roller 60 of the bumper assembly 17 has contacted the wall, and the partition door continues to move toward the wall, the sealing member will be moved downwardly by the clockwise rotation of the parallel linkages 36 and 38 about pivot points 40 and 42 of the carrier means. After the sealing member has been moved downwardly into engagement with the floor, as the partition door continues to move toward the wall, the carrier member 22, which is free to rise along the guide members 18 and 28, will be moved in a longitudinal and vertical direction in regard to the sealing member. Thus, the carrier means will be raised from stops 20 and 30 due to the parallel relation between the carrier means and sealing member maintained by the pivoted linkages 36 and 38. By this arrangement, the compression springs 24 and 32 are compressed, thus applying a downward force on the carrier means.

After the pivoted linkage have passed through a vertical position into the position shown in FIG. 2 and their further movement has been prevented by stop 56, the carrier means and sealing means act as a unit as the carrier means and sealing member are urged downward toward the floor by compression springs 24 and 32. Thus, the carrier means and the sealing member in being urged downward toward the floor surface cause sealing of the sealing member against the floor surface, as shown in FIG. 2. As the remainder of partition doors are brought into position their sealing members are brought into engagement with the floor, as illustrated by sealing member 68 of partition door 12. As partition door 12 is brought in close proximity to partition door 10 the bumper 66 of sealing member 68 is brought in contact with abutment 64 of sealing member 16. The abutment 64 on sealing member 16 is beveled so that the top of sealing member 16 protrudes toward partition door 12 to cause the sealing member 68 to slide downwardly as the partition door 12 is brought toward contact with partition door 10, thus effecting the downward movement of the sealing member against the floor. The action of the floor seal assembly in partition door 12 is similar in all other respects to the structure and movement described in regard to partition door 10. By this arrangement the floor seal assembly of each of the partition doors is sealed tightly against the floor.

When it is desired to retract the partition doors, for example, when partition door 10 is desired to be moved away from engagement with the wall, after the other partition doors have been retracted, the sealing member 16 is held in frictional contact with the floor surface, thus resisting movement as the partition door is initially moved away from the wall. As the partition door 10 continues to move, the carrier means moves in a longitudinal and vertical direction with respect to the sealing member. The compression springs 24 and 32 will be compressed allowing the carrier means to move upward from the sealing member as the pivoted linkages rotate about pivot points 44 and 46. After the linkages 36 and 38 have passed through a vertical position in their counterclockwise rotation about pivot points 44 and 46, extension springs 52 and 54 will then urge the sealing member upward and away from the floor surface to its resting position against stops 56 and 58, as shown in FIG. 1.

By this arrangement, the floor seal assembly in the space to be partitioned retracts automatically upon the partition door being moved from the space to be partitioned.

As indicated in the sectional view shown in FIG. 3, which was taken along the line 3—3 of FIG. 2, the lower portion 70 of the sealing member 16 can be made of a compressible material such as rubber in order to provide a material which can be compressed when forced downward against the floor to provide a tight seal between the sealing member and the floor surface.

A modification of the sealing member is shown in FIG. 4. The sealing member 16 is shown for a wider door with the lower portion 72 being made of a resilient material to engage the floor surface when a compressible material is not desired.

Modifications of the floor seal assembly and its system described herein will occur to those skilled in the art. All such modifications are intended to be within the scope and spirit of the present invention as defined by the appended claims.

I claim:

1. A floor seal assembly for partition doors comprising:
   a sealing member providing a seal between said partition door and the floor surface beneath said partition door,
   carrier means providing a vertically movable coupling between said partition door and said sealing member,
   means connecting said sealing member to said carrier means and allowing movement therebetween,
   means urging said sealing member upward from said floor and towards said carrier means,
   a first stop means for limiting the movement between said carrier means and said sealing member when said sealing member is against said floor surface,
   a second stop means fixed with respect to said partition door and engaged by said carrier means for limiting the downward movement of said carrier means when said sealing member is free of said floor surface,
   yieldable means between said carrier means and said partition door for urging said carrier means downward toward engagement with said second stop means,
   said first stop means causing said carrier means and said sealing member to act as a unit when said first stop means limits the relative movement therebetween so as to induce sealing of said sealing member against said floor surface through said urging of said yieldable means which permits angular displacement of said carrier means and sealing member from said partition door thereby compensating for sloping floors.

2. The floor seal assembly of claim 1 in which said means connecting said sealing member to said carrier means comprises at least two parallel linkages pivotally connected at their ends to said carrier means at one end and to said sealing member at their other end for maintaining parallelism between said carrier means and said sealing member in the course of their relative movement such that said parallel linkages and said first stop means cause said carrier means and said sealing member to act as a unit so as to induce sealing.

3. The floor seal assembly of claim 1 in which said second stop means comprises a projecting member providing an abutment beneath said carrier means for limiting downward movement of said carrier means and being supported by an elongated member which is secured to said partition door.

4. A floor seal assembly for the leading and each of the remainder of partition doors in a series of partition doors comprising:
   a sealing member providing a seal between said partition door and the floor surface beneath said partition door,
   carrier means providing a movable coupling between said partition door and said sealing member,
   means connecting said sealing member to said carrier means and allowing movement therebetween,
   means urging said sealing member upward from said floor and towards said carrier means,
   a first stop means for limiting the movement between said carrier means and said sealing member when said sealing member is against said floor surface,
   a second stop means fixed with respect to said partition door and engaged by said carrier means respectively for limiting the downward movement of said carrier means when said sealing member is free of said floor surface, yieldable means between said carrier means and said partition door for urging said carrier means downward toward engagement with said second stop means, said first stop means causing said carrier means and said sealing member to act as a unit when said first stop means limits the relative movement therebetween so as to induce sealing of said sealing member against said floor surface through said urging of said yieldable means which permits angular displacement of said carrier means and sealing member from said partition door thereby compensating for sloping floors, whereby the sealing member of said leading partition door is activated downward by contact with an abutment and each sealing member of each of said remainder of partition doors in said series of partition doors is actuated downward by contact with the sealing member of the preceding partition door in said series of partition doors.

5. A floor sealing assembly for partition doors comprising:
a sealing member providing a seal between said partition door and the floor surface beneath said partition door,
carrier means providing a movable coupling between said partition door and said sealing member,
at least two parallel linkages pivotally connected at their ends to said carrier means at one end and to said sealing member at their other end for maintaining parallelism between said carrier means and said sealing member and allowing movement between said carrier means and said sealing member,
means urging said sealing member upward from said floor and toward said carrier means,
a first stop means positioned for limiting clockwise and counterclockwise rotationary movement of said parallel linkages,
a second stop means fixed with respect to said partition door and engageable with said carrier means for limiting the downward movement of said carrier means, and
yieldable means between said carrier means and said partition door for urging said carrier means downward toward engagement with said second stop means,
said first stop means causing said carrier means and said sealing member to act as a unit when said first stop means limits the relative movement therebetween so as to effectively induce sealing of said sealing member against said floor surface.

6. A floor seal assembly for partition doors comprising:
a sealing member providing a seal between said partition door and the floor surface beneath said partition door,
carrier means providing a movable coupling between said partition door and said sealing member,
means connecting said sealing member to said carrier means and allowing movement therebetween,
means urging said sealing member upward from said floor and towards said carrier means,
said carrier means having a portion thereof which extends downwardly between the body of said carrier means and said sealing member providing a first stop means so as to limit the movement of said sealing member relative to said carrier means at a predetermined distance therebetween,
a second stop means fixed with respect to said partition door and engageable with said carrier means for limiting the downward movement of said carrier means, and
yieldable means between said carrier means and said partition door for urging said carrier means downward toward engagement with said second stop means,
said first stop means causing said carrier means and said sealing member to act as a unit when said first stop means limits the relative movement therebetween so as to effectively induce sealing of said sealing member against said floor surface.

References Cited by the Examiner
UNITED STATES PATENTS

| | | | |
|---|---|---|---|
| 847,873 | 3/1807 | Anderson | 20—68.3 |
| 1,494,110 | 5/1924 | Hagstrom | 20—67 |
| 1,514,140 | 11/1924 | Dodge | 160—40 |
| 1,561,096 | 11/1925 | Marovich | 20—67 |
| 2,180,112 | 11/1939 | Jones | 160—40 |
| 2,848,767 | 9/1958 | Thompson | 20—68 |
| 2,870,495 | 1/1959 | Wetzel | 160—40 X |
| 3,068,936 | 12/1962 | Haws | 20—68 X |

HARRISON R. MOSELEY, *Primary Examiner.*

D. L. TAYLOR, *Assistant Examiner.*